(12) United States Patent
Kleine et al.

(10) Patent No.: US 7,261,169 B2
(45) Date of Patent: Aug. 28, 2007

(54) SHANK FOR A ROTARY/PERCUSSION TOOL

(75) Inventors: Werner Kleine, Achim (DE); Werner Britten, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 321 days.

(21) Appl. No.: 10/922,551

(22) Filed: Aug. 20, 2004

(65) Prior Publication Data

US 2005/0072600 A1 Apr. 7, 2005

(30) Foreign Application Priority Data

Aug. 22, 2003 (DE) ................. 103 38 640

(51) Int. Cl.
*E21B 10/36* (2006.01)
*E21B 10/44* (2006.01)

(52) U.S. Cl. ............... 175/323; 175/320; 175/395; 175/415; 408/226

(58) Field of Classification Search .............. 175/320, 175/323, 395, 415, 428, 432; 408/226
See application file for complete search history.

(56) References Cited

U.S. PATENT DOCUMENTS 4,840,519 A * 6/1989 Kleine ............... 408/226

2002/0121391 A1* 9/2002 Kleine et al. ............... 175/320

FOREIGN PATENT DOCUMENTS

| DE | 3413432 | | 7/1985 |
|---|---|---|---|
| DE | 8433275 U | | 3/1986 |
| DE | 3941646 | | 6/1991 |
| DE | 4316799 A1 | * | 7/1994 |
| DE | 19604283 | | 8/1997 |
| DE | 10057124 A1 | * | 5/2001 |

* cited by examiner

*Primary Examiner*—Jennifer H. Gay
*Assistant Examiner*—Robert Fuller
(74) *Attorney, Agent, or Firm*—Abelman, Frayne & Schwab

(57) ABSTRACT

A shank for a working tool has at least three recesses (5) provided within the lockable region (3) and arranged in a cross-section (c-c) to the tool axis (A) at least at angles of 0°, 120°, and 240° within the radial reference dimension (R) of the shank, with at least one of the recesses (5) being axially closed toward a free end of the shank (1), and at least one protrusion (6) arranged circumferentially between two adjacent recesses (5) outside of the radial reference dimension, with the sum of central recess angles (α) of the recesses amounting to at least 150°, and a central protrusion angle (β) of the at least one protrusion (6) being smaller than a central recess angle (α).

18 Claims, 3 Drawing Sheets

(I - I)

(II - II)

SHANK FOR A ROTARY/PERCUSSION TOOL

BACKGROUND OF THE INVENTION

1. Field of the Invention

The present invention relates to a shank a rotatable and/or percussively driven working tool such as a drill bit, a chisel, or a core bit for working stone, concrete, or masonry

2. Description of the Prior Art

Usually, a rotary/percussion working tool such as, e.g., disclosed in German Publication DE39 41 646 A1, has a shank extending along the tool axis and having cylindrical guide surfaces, locking grooves, which are axially closed at their ends adjacent to the free end of the shank, and axially open entrained grooves. Radially displaceble locking members, which are provided in an associated chuck, engage in the locking grooves, limiting axial displacement of the working tool.

According to German Publication DE 196 04 283 A1, a shank can have three additional webs which extend up to the free end of the shank and circumferentially arranged between the grooves. The entrained surfaces, which are located radially inwardly with respect to the diameter of the cylindrical guide surfaces, necessitate, because of their small radial distance from the axis, application of high contact surface pressures for effecting torque transmission. As a result of the application of high contact surface pressures, they rapidly wear off. Because these grooves are formed by machining them in a previously round shank, the impact or blow transmitting cross-section, which is available in the shank, is reduced. As a result, disturbing reverberations, which take place, weaken the pulse transmission.

According to German Publication DE 34 13 432 A1, a shank has three circumferentially, uniformly distributed grooves axially closed at their opposite ends. The grooves are formed by a non-cutting, embossing process in a round blank, with radial portions of increased height provided on tangential nut edges. The increased height portions permit to increase the rotation-transmitting outer diameter of the shank, which defines guide surfaces of shanks of different diameters and receivable in a special three jaw chuck. Because the guide surfaces are formed by increased height portions on the tangential groove edge, this shank is unsuitable for transmitting of high torques that cause an extensive wear.

German Utility Model DE 84 33 275 U1 discloses a shank having three circumferentially uniformly distributed grooves closed at their respective opposite axial ends and formed by a non-cutting, embossing process in a round blank. The grooves, which are formed as recesses, are associated with respective radial protrusions. In the shank of the utility model DE 84 33 275 U1, the central recess angle is smaller than the central protrusion angle. With a suitable deformation tool and taking into consideration a longitudinal expansion of the blank during the deformation process, a uniform displacement of material radially outwardly over the cross-sectional area is achieved. Thereby, a rotation-transmitting outer diameter of the shank correspondingly increases. In case when some longitudinal expansion is allowed, the outer diameter corresponds to that of the blank. With wide radial protrusions, the deformable material is not optimally used for increasing the torque transmission.

Accordingly, an object of the present invention is to provide a shank for a rotatable and/or percussively driven working tool capable of transmitting high torques, without being subjected to a noticeable wear, and having good pulse characteristics.

SUMMARY OF THE INVENTION

This and other objects of the present invention, which will become apparent hereinafter, are achieved by providing a shank which rotates about a tool axis and/or percussively displaceable therealong and has, at least partially along the tool axis (A), a radial reference dimension and includes a lockable region, at least three recesses provided within the lockable region and arranged in a cross-section to the tool axis at least at angles of 0°, 120°, and 240° within the radial reference dimension, with at least one of the recesses being axially closed toward a free end of the shank, and at least one protrusion arranged circumferentially between two adjacent recesses outside of the radial reference dimension, wherein a sum of central recess angles of the at least three recesses arranged within the radial reference dimension amounts to at least 150°, and a central protrusion angle of the at least one protrusion is smaller than a central recess angle. With several protrusions, the difference between the sum of the central recess angles and the central protrusion angles amounts to at least 15°.

Because the central recess angle is greater than the central protrusion angle and the sum of central recess angles is greater than the sum of central protrusion angles by at least 15° and with a locking region, which is obtained as a result of deformation of a blank with the radial reference dimension, the radial protrusion dimension, which is obtained as a result of displacement of the material during formation of the locking region, is greater than the radial recess dimension resulting from the formation of recesses with an inverse radius. Therefore, during a transmission of a torque to the working tool, a one-sided tangential force, which is applied radially outwardly to a protrusion, produces smaller contact surface pressures and, thereby, a much smaller wear of the shank.

Advantageously, the central recess of each of the at least three recesses is greater than 60°. This angle insures that a locking member, in particular a locking ball of a chuck adequately engages in a respective recess deeply thereinto to insure a satisfactory axial locking.

Advantageously, a ratio of the sum of the central recess angles to the sum of the central protrusion angles and, optionally, of each central recess angle to each central protrusion angle lies in a range from 1.2 to 2.0. Thereby, with a minimal curvature radius equal to at least the sum of a maximal protrusion dimension and a maximal recess dimension, a recess is formed which has only a slightly curved concave cross-sectional profile. As a result of formation of the recess with only slightly curved concave profile, with respect to alternating stresses generated in a protrusion during the torque transmission, only a small number of notches is formed, whereby a material fatigue in the notch root is avoided.

Advantageously, a ratio of a maximum protrusion dimension, which is determined with respect to the radial reference dimension, to a maximum recess dimension likewise determined with respect to the radial reference dimension, lies in a range from 0.65 to 1.20. With such cross-sectional profile, a sufficiently large, essential for an impact pulse transmission, axially inner core diameter remains.

Advantageously, a ration of the cross-sectional surface of the shank to a circular area determined by the radial reference dimension lies in a range from 0.9 to 1.0. Thereby, the cross-sectional surface of an at least partially formed, locking region, which is produced in a blank with the radial reference dimension, remains substantially the same along the shank, which prevents appearance of performance-decreasing acoustic impedance shocks which lead to reflection of the shock wave.

Advantageously, the cross-sectional profile forms a smooth transition between a recess and a protrusion, which prevents appearance of predestined locations for dust accumulation or of local pressure points which can cause wear of an associated chuck.

Advantageously, in the locking region, there is provided, between a recess and a protrusion, an axially extending guide surface which, optionally can be formed as a cylindrical surface. Such a guide surface provides a substantially wear-free flat surface which insures a proper rotation of the tool.

Advantageously, there are formed, on opposite sides of the lockable region, two axially extending, optionally, cylindrical, guide surfaces. These surfaces permit to transmit to the tool, with minimum wear, high axial bending torque. They also insure a concentric rotation of the tool.

Advantageously, the guide surface, which extends to the free end of the shank, has a length which is at least equal to the radial reference dimension, whereby at the free end, an adequate axial sealing surface is formed even when the free end is subjected to the blows.

Advantageously, there are provided three, exactly the same, recesses closed at their opposite axial ends. Thereby, each of the recesses can be used as a sole axial locking region when the shank is mounted in a chuck.

Advantageously, there are provided several protrusions, preferably, three, whereby, with allowable contact surface pressures, the transmitted torque can be substantially increased without causing any noticeable wear.

Advantageously, there are provided three recesses and three protrusions having, respectively, the same cross-section with, advantageously, each protrusion being located diametrically opposite a respective recess. Thereby, with a hand-ergonomically favorable rotation of the tool by +/−60°, an insertion of the tool in an associated chuck is facilitated.

Advantageously, each separate protrusion has a protrusion angle of less than 50°. Thereby, a wear dimension, which is allowable at a torque transmission, firstly, is passed to the shank via a constructively small projections, the dimensions of which are determined by the protrusion angle and which a subjected, in the chuck, to tangential contact surface pressure. This insures that the service life of the chuck is increased in comparison with a chuck that cooperates with a shank having wide torque-transmitting means.

Advantageously, the recesses and protrusions extend over the entire locable region. Thereby, during the formation of the chuck, the material removed from the recesses is displaced essentially radially into the protrusion.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1 is a side view of a shank for a rotary/percussion working tool according to the present invention;

FIG. 1b is a cross-sectional view along line I-I in FIG. 1a;

DETAILED DESCRIPTION OF THE PREFERRED EMBODIMENT

Figure 1A:
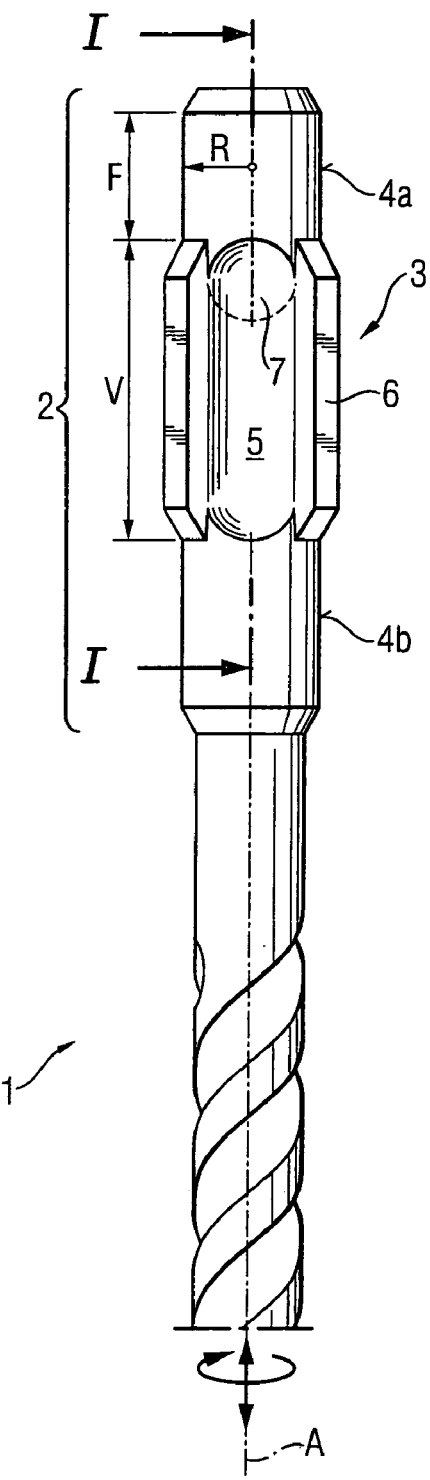
Figure 1B:
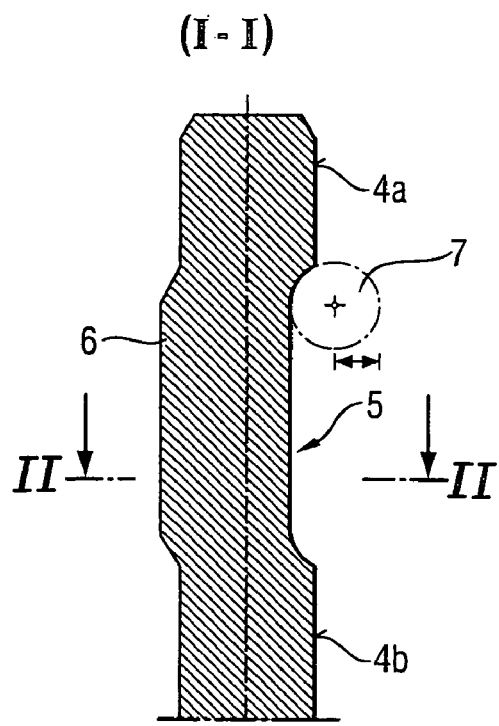
Figure 1C:
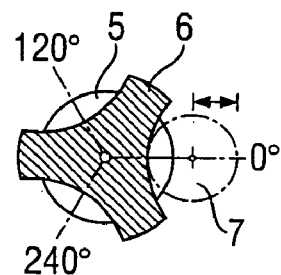
FIG. 1c is a longitudinal cross-sectional view along line II-II in FIG. 1b.

A working tool 1, which can be formed as a drill or chisel rotatable about an axis A and percussively displaceable therealong and which is shown in FIGS. 1a, 1b, 1c, has a shank 2 with a radial reference dimension or radius R and an axial lockable region 3. On both axial sides of the lockable region 3, there are provided two guide surfaces 4a, 4b formed as cylindrical surfaces and having along their axial extent along the axis A a constant radius equal to the radial reference dimension R. Within the lockable region 3, there are provided three stamped-out or otherwise formed recesses 5 closed at their respective opposite axial ends. The guide surface 4a extending toward the free end of the shank 2, has an axial length F that amounts to a double of the radial reference dimension R. The recesses 5 lie inwardly with respect to the radial reference dimension R. The three recesses 5 are associated with three, circumferentially and alternatingly arranged, with respect to the recesses 5, protrusions 6 which lie radially outwardly with respect to a circle with the radial reference dimension R. As shown in FIG. 1c, the three recesses 5 are located in the lockable region exactly at 0°, 120°, and 240° and form with the circumferentially alternatingly arranged protrusion 6 a trigonal rotational symmetry and a mirror symmetry. Each protrusion 6 is arranged exactly diametrically opposite a respective recess 5. Both the recesses 5 and the protrusions 6 extend over the entire length V of the lockable region 3. A radially displaceable locking ball 7 of a chuck, not shown, which is matchingly associated with the shank 2, radially engages in one of recesses 5 of the lockable region 3 for axially securing the tool 1.

Figure 2:
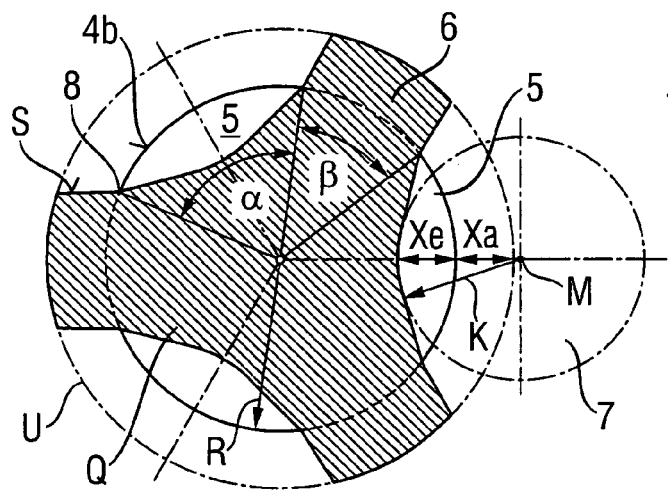
FIG. 2 is a horizontal cross-sectional view of another embodiment of a shank according to the present invention.

FIG. 2 shows an embodiment of a shank particularly adapted to transmission of a high impact energy. This embodiment is characterized by smaller protrusions 6 and by shallow recesses 5. A central recess angle α between two radii R that intersect the bottom surface of a recess 5, amounts to 75°, with the sum of all of the three angles α amounting to 225°. A central protrusion angle β between two radii R that intersect the root of a protrusion 6, amounts to 45°, with the sum of all of the three angles β amounting to 135°. The ratio of both the sum of all of the central recess angles α and of a separate protrusion angle α to the sum of all of the protrusion angles β and to a separate protrusion angle β, respectively, is equal to 1.66. The ratio of a maximum, with respect to the radius R, protrusion dimension Xa to a maximum recess dimension Xe equals 1 for each of the recesses 5 and each of the protrusions 6. The cross-sectional profile S of the recesses 5 is formed slightly concave, with a minimal curvature radius K, which corresponds to the radius of the locking ball 7 of the corresponding chuck and which is greater than a sum of the maximum dimension Xa of the protrusion 6 and maximum dimension Xe of the recess 5. This is because the center M of the locking ball 7, which engages in a recess 5, lies outside of a circumferences U that limits the protrusions 6. The ratio of the cross-sectional surface Q to the circular area $\pi R^2$ of a circle with radius R is equal to 0.95. In the transition area from the recess 5 to the adjacent protrusion 6, the cross-sectional profile S has a concave bend 8.

Figure 3:
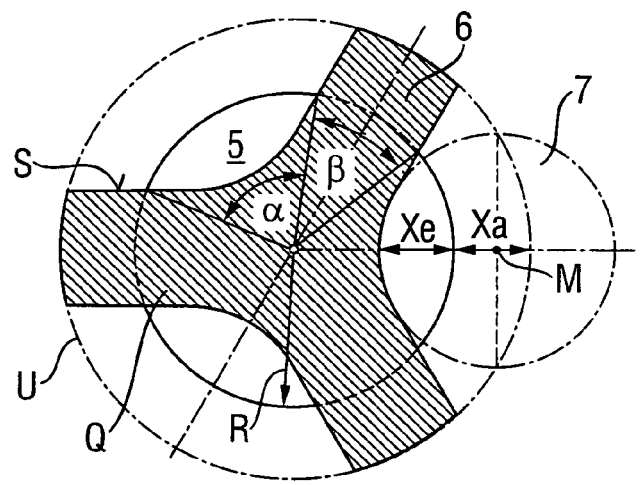
FIG. 3 is a horizontal cross-sectional view of a further embodiment of a shank according to the present invention.

FIG. 3 shows an embodiment of a shank which is particularly adapted to transmission of high torques. This embodiment is characterized by deep recesses 5 and by large but narrow protrusions 6. The cross-sectional profile 5 has a mathematically smooth bend-free transition from a recess 5 to an adjacent protrusion 6. A central recess angle α between two radii R that intersect the bottom surface of a recess 5, amounts to 77°, with the sum of all of the three angles α amounting to 231°. A central protrusion angle β between two radii R that intersect the root of a protrusion 6, amounts to 43°, with the sum of all of the three angles β, with the sum of all of the three angles β amounting to 129°. The ratio of both the sum of all of the central recess angles α and of a separate protrusion angle α to the sum of all of the protrusion angles β and to a separate protrusion angle β, respectively, is equal to 1.79. The ratio of a maximum, with respect to the radius R, protrusion dimension Xa to a maximum recess dimension Xe equals 1 for each of the recesses 5 and each of the protrusions 6.

Figure 4:
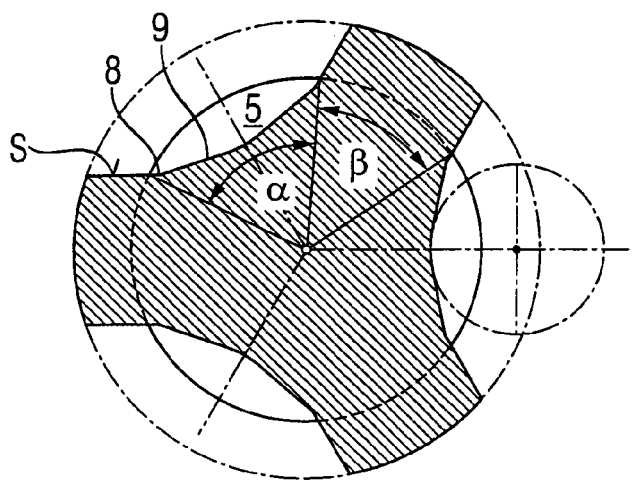
FIG. 4 is a horizontal cross-sectional view of a still further embodiment of a shank according to the present invention.

In the embodiment of an inventive shank shown in FIG. 4, the concave bend 8 of the cross-sectional profile 5 lies within an angular recess 5 with sides 9 of the central recess angle being equal to each other.

Figure 5:
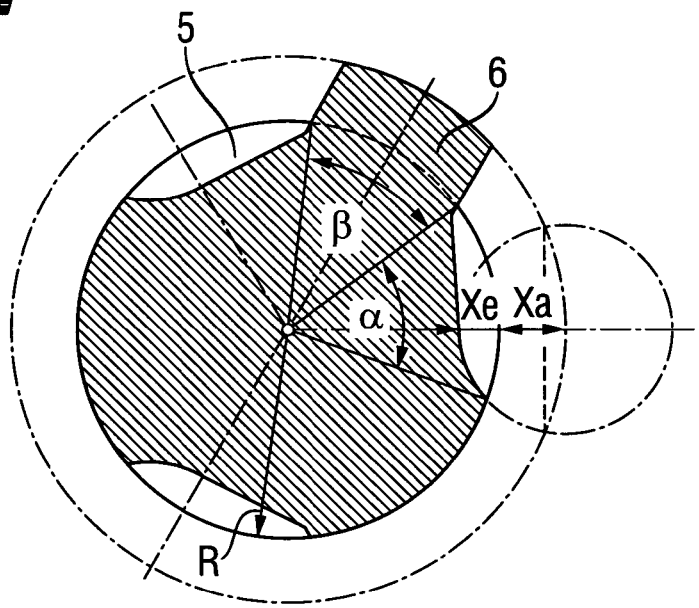
FIG. 5 is a horizontal cross-sectional view of a yet another embodiment of a shank according to the present invention.

In the embodiment of an inventive shank shown in FIG. 5, three identical recesses 5 are somewhat offset with respect to angles of 0°, 120°, and 240°, have each a central recess angle of 55° and do not have a trigonal symmetry or a mirror symmetry. The ratio of the maximum protrusion dimension Xa, with respect to the radius R, of a single protrusion 6 to a maximum recess dimension Xe of a recess 5 is equal to 1.2.

Figure 6:
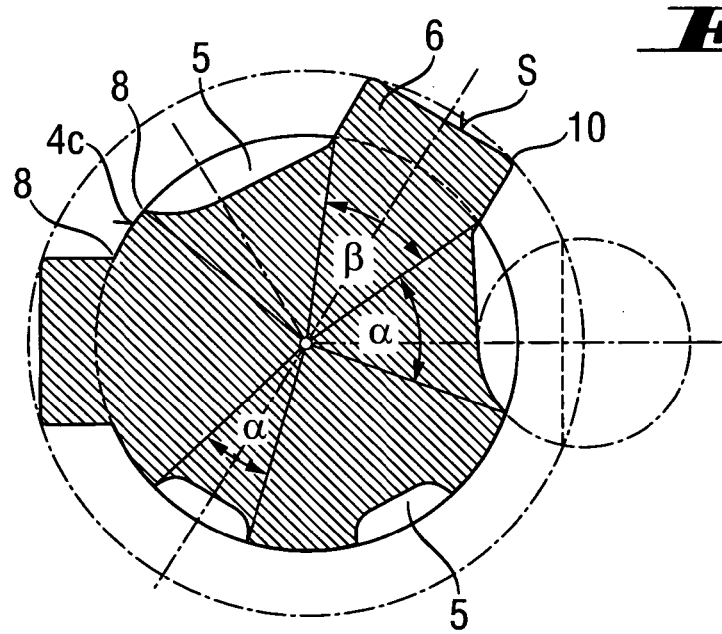
FIG. 6 is a horizontal cross-sectional view of a yet further embodiment of a shank according to the present invention.

In the embodiment of a shank shown in FIG. 6, there are provided two wide recesses with a central recess angle α of 55° and two narrow recesses 5 with a central recess angle α of 30°. The four recesses 5 are circumferentially distributed, without defining a trigonal rotational symmetry or a mirror symmetry. One of the protrusions 6 is located between narrow and wide recesses 5. Between this protrusion 6 and the adjacent recesses 5, there is provided an axially, extending, cylindrical guide surface 4c having the radius R. The cross-sectional is profile S has, in the transition region between the guide surface 4c and the protrusion 6 and the transition region between the guide surface 4c and the recess 5, a respective convex bend 8. The radially outer cross-sectional profile S is formed at both of the protrusions 6 flash with an obtuse angles 10.

Though the present invention was shown and described with references to the preferred embodiment, such is merely illustrative of the present invention and are not to be construed as a limitation thereof and various modifications of the present invention will be apparent to those skilled in the art. It is therefor not intended that the present invention be limited to the disclosed embodiment or details thereof, and the present invention includes all variations and/or alternative embodiments within the spirit and scope of the present invention as defined by the appended claims.

What is claimed is:

1. A shank for a working tool which is at least one of rotatable about a tool axis (A) and percussively displaceable therealong, the shank having, at least partially along the tool axis (A), a radial reference dimension (R) and comprising a lockable region (3); at least three recesses (5) provided within the lockable region (3) and arranged in a cross-section (II-II) to the tool axis (A) at least at angles of 0°, 120°, and 240° within the radial reference dimension (R), with at least one of the recesses (5) being axially closed toward a free end of the shank (1); and at least one protrusion (6) arranged circumferentially between two adjacent recesses (5) and outside of the radial reference dimension (R), wherein a sum of central recess angles (α) of the recesses (5) arranged within the radial reference dimension (R) in a cross-section (II-II) amounts to at least 150°, and a sum of central protrusion angles (β) of the at least one protrusion (6) is less than 150°, and a difference between the sum of the central recess angles (α) and the sum of the central protrusion angles (β) amounts to at least 15°; and wherein an axially extending guide surface (4c) is provided in a circumferential region between a recess (5) and a projection (6) in the lockable region (3).

2. The shank according to claim 1, wherein the central recess angle (α) of each of the at least three recesses (5) is greater than 60°.

3. The shank according to claim 1, wherein a ratio of the sum of the central recess angles (α) to the sum of the central protrusion angles (β) lies in a range from 1.2 to 2.0.

4. The shank according to claim 1, wherein a ratio of a central recess angle (α) to the central protrusion angle (β) lies in a range from 1.2 to 2.0.

5. The shank according to claim 1, wherein a ratio of a maximum protrusion dimension (Xa) to a maximum recess dimension (Xe) lies in a range from 0.65 to 1.20, wherein said maximum protrusion dimension and said maximum recess dimension are determined with respect to the radial reference dimension (R).

6. The shank according to claim 1, wherein a ratio of a cross-sectional surface area (Q) of the shank to a circular area determined by the radial reference dimension (R) lies in a range from 0.9 to 1.0.

7. The shank according to claim 1, wherein the cross-sectional profile (S) forms a smooth transition between a recess (5) and the at least one protrusion (6).

8. The shank according to claim 1, wherein the guide surface (4c) is formed as a cylindrical surface.

9. The shank according to claim 1, comprising two axially extending guide surfaces (4a, 4b) formed on opposite axial sides of the lockable region (3).

10. The shank according to claim 9, wherein the two axially extending guide surfaces (4a, 4b) are formed as cylindrical surfaces.

11. The shank according to claim 9, wherein the guide surface (4a) extending toward a free end of the shank has a length (F) that is equal to at least the radial reference dimension (R).

12. The shank according to claim 1, wherein the at least three recesses (5) are closed each at opposite axial ends thereof.

13. The shank according to claim 12, wherein the at least three recesses (5) a circumferentially symmetrically distributed.

14. The shank according to claim 1, comprising more than three recesses (5) provided in the lockable region (3) and arranged within the radial reference dimension (R).

15. The shank according to claim 1, wherein there are provided three recesses (5) and three protrusion (6) within a cross-section (II-II) of the shank.

16. The shank according to claim 15, wherein each protrusion (6) is arranged opposite a respective recess (5).

17. The shank according to claim 1, wherein each protrusion (6) has a central protrusion angle (β) of less than 50°.

18. The shank according to claim 1, wherein the recesses (5) and the protrusions (6) extend axially over an entire length of the lockable region (3).

* * * * *